(12) United States Patent
Yang et al.

(10) Patent No.: US 12,483,913 B2
(45) Date of Patent: Nov. 25, 2025

(54) METHOD FOR EVALUATING NETWORK SERVICE, ELECTRONIC DEVICE AND STORAGE MEDIUM

(71) Applicant: ZTE CORPORATION, Guangdong (CN)

(72) Inventors: Weiwei Yang, Guangdong (CN); Yizhong Zhan, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 476 days.

(21) Appl. No.: 18/093,909

(22) Filed: Jan. 6, 2023

(65) Prior Publication Data
US 2023/0156499 A1    May 18, 2023

Related U.S. Application Data

(63) Continuation of application No. PCT/CN2021/125784, filed on Oct. 22, 2021.

(30) Foreign Application Priority Data

Oct. 26, 2020   (CN) .......................... 202011155978.7

(51) Int. Cl.
  *H04W 24/08*   (2009.01)
  *H04M 3/22*    (2006.01)

(52) U.S. Cl.
  CPC ......... *H04W 24/08* (2013.01); *H04M 3/2218* (2013.01)

(58) Field of Classification Search
  CPC ... H04W 24/08; H04W 24/00; H04M 3/2218; H04M 2203/556; H04M 3/36;
  (Continued)

(56) References Cited

U.S. PATENT DOCUMENTS 9,087,176 B1 *   7/2015   Chang ....................... G03F 1/36
11,546,234 B2    1/2023   Xue et al.
(Continued)

FOREIGN PATENT DOCUMENTS

CN       102104900 A       6/2011
CN       103840978         6/2014
(Continued)

OTHER PUBLICATIONS

International search report of the corresponding PCT Application No. PCT/CN2021/125784 mailed on Dec. 24, 2021 along with English translation thereof.
(Continued)

*Primary Examiner* — Dhaval V Patel
(74) *Attorney, Agent, or Firm* — NZ Carr Law Office

(57) ABSTRACT

Embodiments of the present application relate to the field of communications, and provide a method for evaluating a network service, an electronic device and a storage medium. The method for evaluating a network service comprises: performing statistical analysis on each key quality indicator (KQI) according to call detail record (CDR) data in a first cycle, to obtain a first threshold of each KQI; obtaining a (Continued)

performing statistical analysis on each KQI according to CDR data in a first cycle, to obtain a first threshold of each KQI — 101 obtaining a second threshold of each KQI according to the first threshold of each KQI in a second cycle, wherein, the second cycle comprises at least one first cycle — 102 obtaining a perception score of the network service according to the second threshold of each KQI and CDR data in a third cycle — 103 second threshold of each KQI according to the first threshold of each KQI in a second cycle, wherein, the second cycle comprises at least one first cycle; and obtaining a perception score of the network service according to the second threshold of each KQI and CDR data in a third cycle. The method is applied to the process of evaluating the network service.

13 Claims, 7 Drawing Sheets

(58) Field of Classification Search
CPC ..... H04L 41/142; H04L 41/509; H04L 43/12; H04L 43/16; H04L 41/5009; H04L 41/5067; G06Q 50/40; G06Q 10/06; G06Q 10/06393; G06F 17/18; G06F 18/24
See application file for complete search history.

(56) References Cited

U.S. PATENT DOCUMENTS

| | | | |
|---|---|---|---|
| 2014/0337871 A1* | 11/2014 | Garcia De Blas . | H04N 21/4667 725/14 |
| 2017/0364819 A1* | 12/2017 | Yang ....................... | H04L 41/16 |
| 2018/0006957 A1* | 1/2018 | Ouyang ................. | H04L 65/65 |
| 2018/0225617 A1 | 8/2018 | Leung et al. | |
| 2019/0173898 A1 | 6/2019 | Bharrat et al. | |

FOREIGN PATENT DOCUMENTS

| | | |
|---|---|---|
| CN | 104378220 | 2/2015 |
| CN | 104410516 A | 3/2015 |
| CN | 105554782 A | 5/2016 |
| CN | 101562830 | 10/2019 |

OTHER PUBLICATIONS

Office action of the corresponding IN Patent Application No. 202317000259 (with English translation thereof) issued on Nov. 23, 2023.

Dr Irina Cotanis Infovista USA: "Draft New Recommendation" Statistical Framework for network end to end benchmarking scoring and ranking"(E.NetPerfRank) (for consent); TD438R1", ITU-T Draft; Study Period 2017-2020; Study Group 12; Series TD438R1 , International Telecommunication Union, Geneva; CH, vol.12/12 May 8, 2018 (May 8, 2018), pp. 1-15, XP044244372, Retrieved from the Internet: URL: https://www.itu.int/ifa/ifa/.

* cited by examiner

METHOD FOR EVALUATING NETWORK SERVICE, ELECTRONIC DEVICE AND STORAGE MEDIUM

CROSS REFERENCE

This application is based on Chinese patent application with the application number of "202011155978.7" and the application date of Oct. 26, 2020, and claims the priority of the Chinese patent application. All contents of the Chinese patent application are incorporated herein by introduction.

TECHNICAL FIELD

Embodiments of the present application relate to the field of communications, in particular to a method for evaluating a network service, an electronic device and a storage medium.

BACKGROUND

Along with the rapid development of modern communication science and technology, users have higher and higher requirements for the quality of network services. Therefore, it is necessary for network operators to establish an effective end-to-end comprehensive evaluation system for service perception, so as to timely discover and solve the problem of low quality service in the whole network, and finally provide high-quality network service for users. At present, the evaluation means for service perception of the network operator mainly comprises taking a fixed empirical threshold of a quality indicator as the evaluation standard, and evaluating the quality of the network service by comparing the quality indicator data of the present network service with the fixed empirical threshold of the quality indicator.

However, under the condition that the network quality indicator fluctuates normally, due to that the fixed threshold of the quality indicator cannot adapt to the change, the normally fluctuating network quality indicator is evaluated as being abnormal, and thus an evaluation error is caused.

SUMMARY

Embodiments of the present application provide a method for evaluating a network service, comprising: performing statistical analysis on each key quality indicator (KQI) according to call detail record (CDR) data in a first cycle, to obtain a first threshold of each KQI; obtaining a second threshold of each KQI according to the first threshold of each KQI in a second cycle, wherein, the second cycle comprises at least one first cycle; and obtaining a perception score of the network service according to the second threshold of each KQI and CDR data in a third cycle.

Embodiments of the present application further provide an electronic device, comprising: at least one processor; and a memory in communication connection with the at least one processor; wherein, the memory stores instructions that can be executed by the at least one processor, and the instructions are executed by the at least one processor, so that the at least one processor can execute the above said method for evaluating the network service.

Embodiments of the present application further provide a computer readable storage medium, which stores a computer program, wherein, when the computer program is executed by the processor, the above said method for evaluating the network service is implemented.

DETAILED DESCRIPTION

In order to make the purpose, technical solution and advantages of the embodiments of the application clearer, the embodiments of the application will be described in detail below in combination with the drawings. However, those skilled in the art can understand that in each embodiment of the application, many technical details are proposed to enable the readers to better understand the application. However, even without these technical details and various changes and modifications based on the following embodiments, the technical solution claimed in the application can be implemented. The following division of embodiments is for the convenience of description, and would not limit the specific implementation mode of the application. All the embodiments can be combined and referred to each other without contradiction.

The embodiments of the application mainly aim to provide a method for evaluating a network service, an electronic device and a storage medium, which can correctly and objectively evaluate the quality of the network service under the condition that a network quality indicator fluctuates normally.

Figure 1:
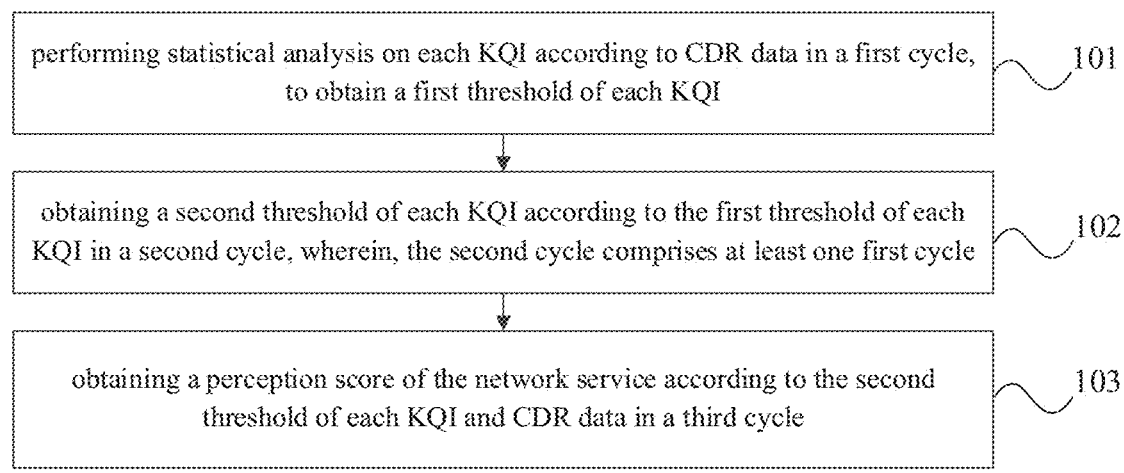
FIG. 1 is a flow chart of a method for evaluating a network service according to a first embodiment of the application.

The first embodiment of the application relates to a method for evaluating the network service, which can be applied to the network service evaluation in communication systems such as 3G (the 3rd Generation Telecommunication), 4G (the 4th Generation Telecommunication) and the like. As shown in FIG. 1, the method comprises:

Step 101, performing statistical analysis on each KQI (key quality indicator) according to CDR (call detail record) data in a first cycle, to obtain a first threshold of each KQI.

In the embodiment, the first cycle is pre-determined. The KQI (key quality indicator) is a service quality parameter which is proposed mainly for different services and is close to user experience, the embodiment does not give specific examples for the KQI of network services, and in the actual use, the Step 101 can be used to statistically analyze any KQI of any network service.

It should be illustrated that in the embodiment, CDR data in the first cycle comprises CDR data of at least one type of the network service, and any type of network service corresponds to at least one KQI.

Step 102, obtaining a second threshold of each KQI according to the first threshold of each KQI in a second cycle, wherein, the second cycle comprises at least one first cycle.

In the embodiment, the second cycle comprises at least one first cycle, and for each first cycle in the second cycle, the first threshold of the KQI can be obtained according to the Step 101. All the obtained thresholds of each KQI are analyzed comprehensively to obtain a more effective second threshold. The method for comprehensive analysis may be an averaging method, and it should be illustrated that the specific averaging method is not defined in this embodiment and the following other embodiments.

Step 103, obtaining a perception score of the network service according to the second threshold of each KQI and CDR data in a third cycle.

In the embodiment, a quantized value for perception evaluation of the network service can be obtained by comparing the obtained effective threshold with the KQI in the CDR data, and making further analysis according to the comparison result, and the quantized value may be directly used as the perception score, or a value obtained by further analysis and processing may be used as the perception score.

It should be illustrated that, in the embodiment each type of network service has a perception score, and the perception score obtained by the Step 103 is that of at least one type of network service.

In the embodiment of the application, statistical analysis can be performed on KQI according to CDR data in the first cycle, to obtain a first threshold of each KQI, so that the first threshold of each KQI is a threshold influenced by the CDR data in the first cycle and adapted to change rather than a fixed value; then, the second threshold of each KQI is obtained by processing all the first thresholds included in the second cycle, so that the obtained threshold is more effective and reliable; further, the perception score of the network service is obtained according to the second threshold of each KQI, evaluation for the network service is quantized, so that an evaluation result is more objective. The problem that under the condition that the network quality indicator fluctuates normally, due to that the fixed threshold of the quality indicator cannot adapt to change, the normally fluctuating network quality indicator is evaluated as being abnormal, and thus an error is caused is solved. The first threshold of each KQI is obtained by performing statistical analysis on the KQI according to the CDR data, therefore the threshold of the KQI changes along with the CDR data, and thus can adapt to dynamic change displayed by CDR data of the network service, namely, when the technical solution provided by the embodiment of the application is used to evaluate the network service, the dynamically changing threshold can be used as the evaluation standard to evaluate the network service in a more flexible and more accurate way.

Figure 2:
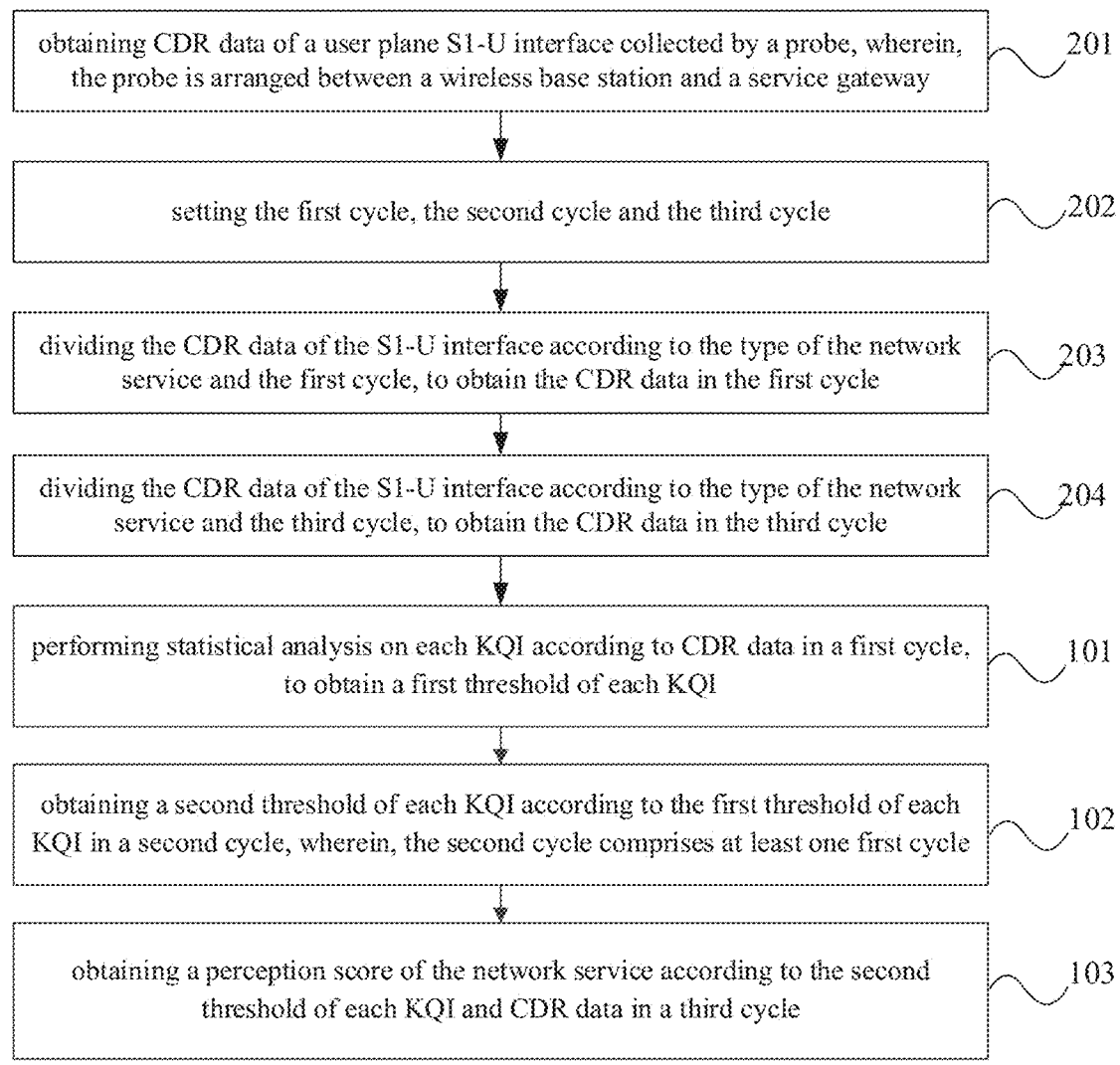
FIG. 2 is a flow chart of a method for evaluating a network service according to a second embodiment of the application.

The second embodiment of the application relates to a method for evaluating a network service, which is basically the same as the method for evaluating the network service in the first embodiment of the application, and the difference therebetween is that CDR data of the same network service needs to be obtained, and as shown in FIG. 2, the method further comprises:

Step 201, obtaining CDR data of a user plane S1-U interface collected by a probe, wherein, the probe is arranged between a wireless base station and a service gateway.

Figure 3:
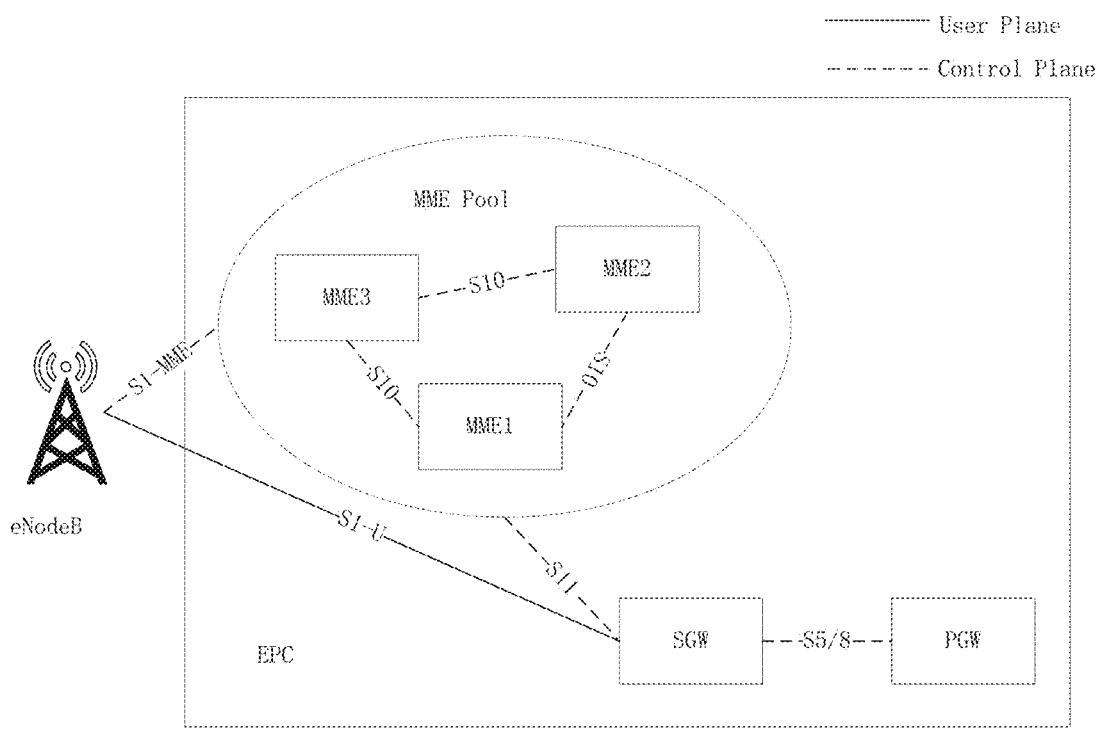
FIG. 3 is a partial networking schematic diagram of evolved packet core in long term evolution in the second embodiment of the application.

In the embodiment, in the partial networking diagram of EPC (evolved packet core) as shown in FIG. 3, the SGW (service gateway) is mainly responsible for processing of the user plane, is responsible for functions of data packet routing, forwarding and the like, supports switching among different access technologies of 3GPP (Third Generation Partnership Project), and serves as an anchor of the user plane during switching, i.e., each user equipment related to the evolved packet system is served by a SGW at one time point; and the user plane S1-U is a major interface of the EPC network, which is located between the wireless base station and the SGW. eNodeB is evolved Node B (the name of a base station in long term evolution, LTE), EPC is the abbreviation of Evolved Packet Core, PGW is the abbreviation of PDN (public data network) gateway, MME is the abbreviation of Mobility Management Entity, and S1-U, S1-MME, S5/8, S11 and S10 are corresponding interfaces among different connection objects in EPC networking. Therefore, the probe arranged between the wireless base station and the SGW can be used to collect data of the user plane S1-U interface, and the S1-U interface obtains XDR (External Data Representation) CDR data.

Step 202, setting the first cycle, the second cycle and the third cycle.

In the embodiment, the first cycle and the third cycle are not defined, and can be set according to actual requirement in the realization process, and the second cycle can be set according to requirements on the premise of meeting the condition of comprising one or more first cycles.

Step 203, dividing the CDR data of the S1-U interface according to the type of the network service and the first cycle, to obtain the CDR data in the first cycle.

In the embodiment, the network services can be divided into types including web page type, video type, game type, OTT (Over-the-top media services) voice type, OTT video type and traffic type according to the service characteristic and the network performance requirement. Of course, the above are only specific examples, in the actual use, the types of the network service may comprise other types or types obtained by division according to other criteria, which are not enumerated herein.

Specifically, firstly different types, including the web page type, video type, game type, OTT voice type, OTT video type and traffic type, of CDR data are respectively screened and divided from XDR CDR of the S1-U interface in one day according to the type of the network service; then, the data is further divided according to data obtaining time by taking the first cycle as the basic unit, to obtain CDR data in the first cycle. It should be illustrated that data in one day is only exemplary, data in other duration can be also used, and the sequence between division according to the network service and division according to the first cycle is not defined.

Step 204, dividing the CDR data of the S1-U interface according to the type of the network service and the third cycle, to obtain the CDR data in the third cycle.

In the embodiment, the network services can be divided into types including the web page type, video type, game type, OTT voice type, OTT video type and traffic type according to the service characteristics and the network performance requirement. Of course, the above are only specific examples, in the actual use, the types of the network service may comprise other types or types obtained by division according to other criteria, which are not enumerated herein.

Specifically, firstly different types, including the web page type, video type, game type, OTT voice type, OTT video type and traffic type, of CDR data are respectively screened and divided from XDR CDR of the S1-U interface in one day according to the type of the network service; then, the data is further divided according to data obtaining time by taking the third cycle as the basic unit, to obtain CDR data in the third cycle. It should be illustrated that data in one day is only exemplary, data in other duration can be also used, and the sequence between division according to the network service and division according to the third cycle is not defined.

On the basis of beneficial effects of the first embodiment, the embodiment of the application can be used to obtain the divided CDR data in real time while dynamically obtaining the threshold of KQI, so that real-time perception of change of the network service quality indicator can be achieved, further, the obtained threshold is more sensitive to data change, and the perception score is more accurate.

Figure 4:
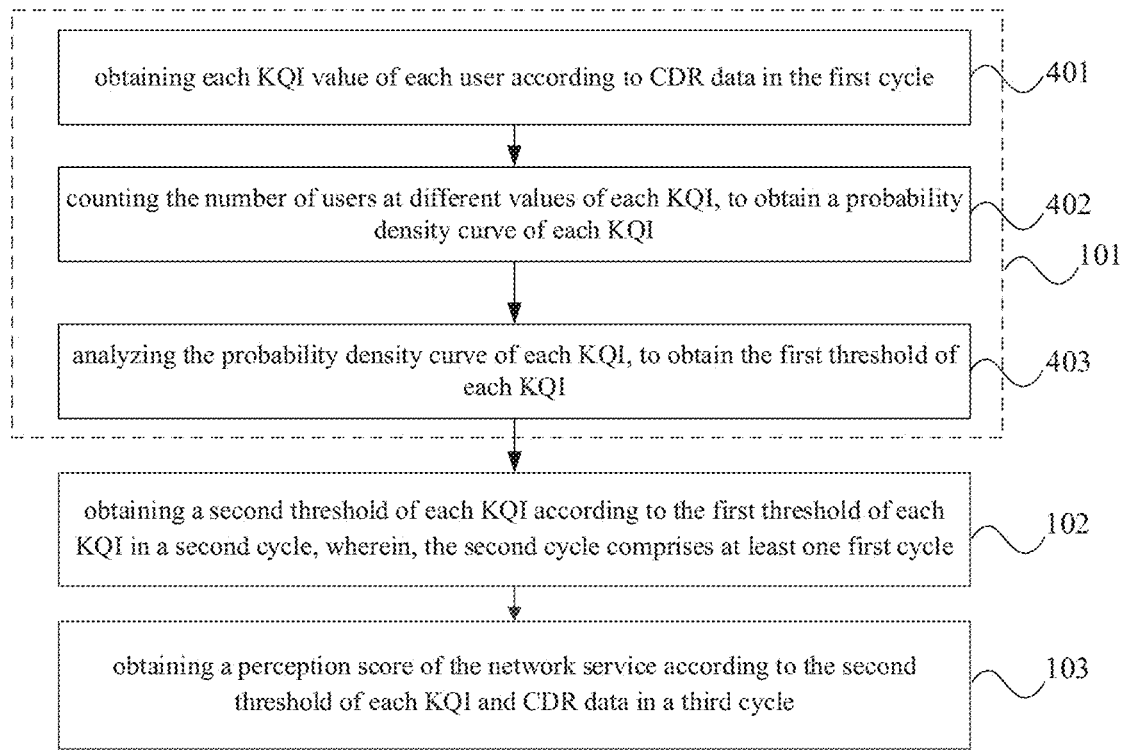
FIG. 4 is a flow chart of a method for evaluating a network service according to a third embodiment of the application.

The third embodiment of the application relates to a method for evaluating a network service, which is basically the same as the method for evaluating the network service in the first embodiment of the application, and the difference therebetween is that, as shown in FIG. 4, the Step 101 comprises:

Step 401, obtaining each KQI value of each user according to CDR data in the first cycle.

In the embodiment, CDR data in the first cycle is CDR data obtained within a certain period, therefore, for each user, one KQI corresponds to a group of data. Specifically, all values of certain KQI in the first cycle of each user are averaged, or the median is calculated, and the value after averaging or median processing is used as the KQI value of each user. Of course, the group of data of each user can be processed by other statistical methods to obtain a KQI value which can reflect characteristic of the group of KQI values in the first cycle of the user.

Step 402, counting the number of users at different values of each KQI, to obtain a probability density curve of each KQI.

In the embodiment, specifically, if certain network service corresponds to N KQIs, then the number of users at certain value $KQI_{in}$ of the ith KQI is m, the total number of the users is M, then, the probability of $KQI_{in}$ occurrence is $$\frac{m}{M},$$

and the density curve function of the ith KQI is $$f(KQI_{in}) = \frac{m_{in}}{M_i},$$

wherein, $KQI_{in}$ is the specific value of the ith KQI indicator, $m_{in}$ is the number of users corresponding to the specific value $KQI_{in}$, and $M_i$ is the total number of users corresponding to the ith KQI indicator.

Step 403, analyzing the probability density curve of each KQI, to obtain the first threshold of each KQI.

Figure 5:
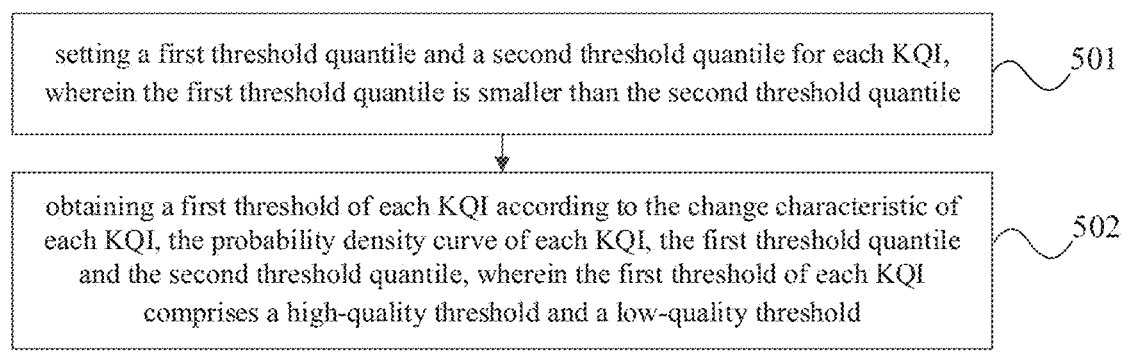
FIG. 5 is a flow chart of step 403 of the method for evaluating the network service according to the third embodiment of the application shown in the FIG. 4.

Specifically, as shown in FIG. 5, the Step 403 may comprise:

Step 501, setting a first threshold quantile and a second threshold quantile for each KQI, wherein the first threshold quantile is smaller than the second threshold quantile.

In the embodiment, the value range of the first threshold quantile and the second threshold quantile is (0, 1), which can be set according to the actual situation or take the default values. The first threshold quantiles and the second threshold quantiles of different KQIs can be the same or be different. It should be illustrated that the first threshold quantile is set to be smaller than the second threshold quantile only for the convenience of representation.

It should be illustrated that in the embodiment, two threshold quantiles are set, but in the actual use, the number of threshold quantiles is not defined, one or more threshold quantiles can be set according to actual requirements.

Step 502, obtaining a first threshold of each KQI according to the change characteristic of each KQI, the probability density curve of each KQI, the first threshold quantile and the second threshold quantile, wherein the first threshold of each KQI comprises a high-quality threshold and a low-quality threshold.

In the embodiment, the first threshold quantile is set as $p_i$, the second threshold quantile is set as $p_2$, and $0<p_1<p_2<1$, then when the KQI is the larger, the better (the KQI is a positive indicator at this time), the low-quality threshold quantile is $p_1$, the high-quality threshold quantile is $p_2$, the KQI value corresponding to the quantile $p_1$ is low-quality threshold $worst_{dynamic}$, and the KQI value corresponding to the quantile $p_2$ is high-quality threshold $best_{dynamic}$; and when the KQI is the smaller, the better (the KQI is a negative indicator at this time), the high-quality threshold quantile is $p_i$, the low-quality threshold quantile is $p_2$, the KQI value corresponding to the quantile $p_1$ is the high-quality threshold $best_{dynamic}$, and the KQI value corresponding to the quantile $p_2$ is the low-quality threshold $worst_{dynamic}$.

Figure 6:
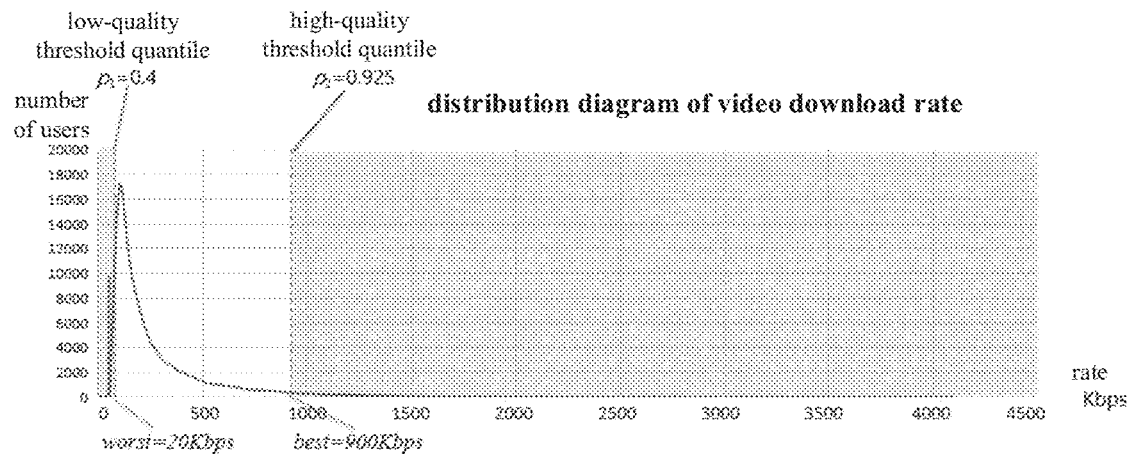
FIG. 6 is a distribution curve diagram of a video download rate indicator in the third embodiment of the application.
Figure 7:
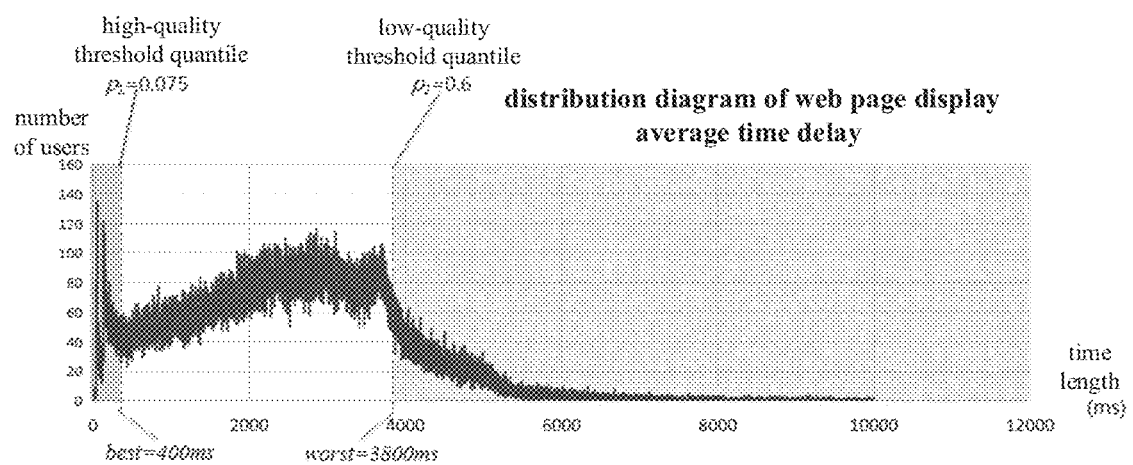
FIG. 7 is a distribution curve diagram of a web page display average time indicator in the third embodiment of the application.

More specifically, taking video-on-demand service of the operating network of the operator O in certain country as an example, a distribution curve of a video download rate indicator calculated according to the user dimension in the time granularity of day is shown as in FIG. 6, and the video download rate indicator is a positive indicator. It is set that the low-quality threshold quantile $p_1=0.4$, the high-quality threshold quantile $p_2=0.925$, and according to the ascending sequence of the video download rate indicator, the indicator value of the quantile $p_1$ is taken as the low-quality threshold $worst_{dynamic}$, and the indicator value of the quantile $p_2$ is taken as the high-quality threshold $best_{dynamic}$ After calculation, the adaptive threshold of the video download rate is $worst_{dynamic}$ 20 Kbps, and $best_{dynamic}$ 900 Kbps. Taking web page browsing service of the operating network of the operator O in certain country as an example, a distribution curve of a web page display average time indicator calculated according to the user dimension in the time granularity of day is shown as in FIG. 7, and the web page display average time indicator is a negative indicator. It is set that the high-quality threshold quantile $p_1=0.075$, the low-quality threshold quantile $p_2=0.6$, and according to the ascending sequence of the web page display average time indicator, the indicator value of the quantile $p_1$ is taken as the high-quality threshold best dynamic, dynamic, and the indicator value of the quantile $p_2$ is taken as the low-quality threshold $worst_{dynamic}$ After calculation, the adaptive threshold of the web page display average time is $worst_{dynamic}=3800$ ms, and $best_{dynamic}=400$ ms.

On the basis of beneficial effects of the first embodiment, the embodiment of the application can determine the value at certain special position after sequential distribution of KQI values by means of probability distribution, and take the special value as the threshold, so that the obtained threshold is more objective and more accurate.

Figure 8:
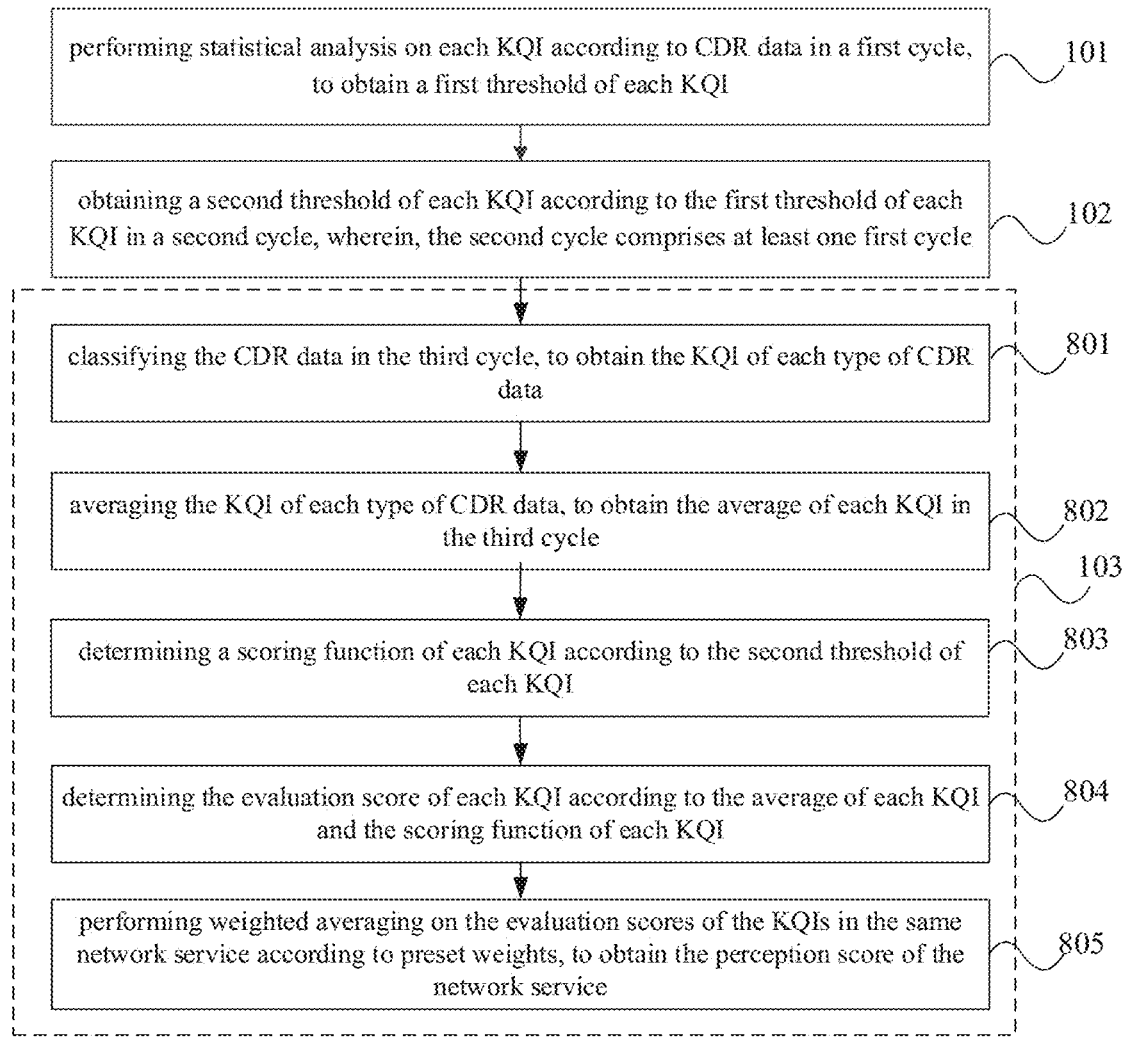
FIG. 8 is a flow chart of a method for evaluating a network service according to a fourth embodiment of the application.

The fourth embodiment of the application relates to a method for evaluating a network service, which is basically the same as the method for evaluating the network service in the first embodiment of the application, and the difference therebetween is that, as shown in FIG. 8, the Step 103 comprises:

Step 801, classifying the CDR data in the third cycle, to obtain the KQI of each type of CDR data.

In the embodiment, classification is made according to one or more combinations of dimensions such as user, province, city, county, area, district, APP or site. Of course, the above are only specific examples, in the actual use, the classification method may comprise other classification criteria, which are not enumerated herein.

It should be illustrated that, in the embodiment, the minimum unit of the obtained KQI of each type of CDR data is a single user, and for the user, the obtained KQI corresponds to that of the Step 401, e.g., the KQI of the user in a period is averaged in the Step 401, the obtained KQI of the minimum unit in the Step 801 should be averaged as well, and each type is then calculated based on the average of each user.

Step 802, averaging the KQI of each type of CDR data, to obtain the average of each KQI in the third cycle.

Step 803, determining a scoring function of each KQI according to the second threshold of each KQI.

In the embodiment, the specific mapping relation of the scoring function of each KQI is related to the second threshold, and it can be mapped to the set whole scoring value range. In this way, the problem that the score cannot directly reflect the difference among the quality represented by the KQI values due to the fact that only a small amount of values can be used for scoring can be overcome. It should be illustrated that, the specific mapping relation of the scoring function is not defined, any function satisfying the above can be used as the scoring function.

Specifically, taking scoring result of QoE (the value range of QoE is 0-5 points according to the formula for QoE) as an example, the score Score of the ith KQI of certain network service can use the following formula:

$$Score_i = \begin{cases} 2 \times \left(\dfrac{\overline{x_i}}{worst_i}\right)^{direction}, & (\overline{x_i} - worst_i) \times direction \leq 0 \\ 3 \times \left(\dfrac{|\overline{x_i} - worst_i|}{|best_i - worst_i|}\right)^{direction} + 2, & |\overline{x_i} - worst_i| \leq |best_i - worst_i| \\ 5, & (\overline{x_i} - best_i) \times direction > 0 \end{cases}$$

wherein: $Score_i$ is the score of the ith KQI of the network service, $worst_i$ is the low-quality threshold of the ith KQI of the network service, best is the high-quality threshold of the ith KQI of certain network service, and worst and $best_i$ are values obtained from the third embodiment. direction refers to the direction of the indicator, for example, the KQI which is the larger the better is a positive indicator, and direction=1, otherwise, direction=−1. It should be illustrated that, in the actual realization process, the value range of scoring is not defined, however, the value ranges of all KQI scores in the same network are kept consistent.

Step 804, determining the evaluation score of each KQI according to the average of each KQI and the scoring function of each KQI.

In the embodiment, the specific method is that the average of each KQI is sequentially substituted into the scoring function of corresponding KQI obtained in the Step 803, and the obtained function value serves as the evaluation score of each KQI.

Step 805, performing weighted averaging on the evaluation scores of the KQIs in the same network service according to preset weights, to obtain the perception score of the network service.

In the embodiment, the formula for the perception score is:

$$QoE = \sum_{i=1}^{N} w_i * Score_i,$$

wherein: Score is calculated in the Step 804, $w_i$ is the preset weight of the ith KQI, and is satisfied, $w_i \geq 0$.

$$\sum_{i=1}^{N} w_i = 1$$

It should be illustrated that, the weight is set according to actual requirements, and can be preset according to the significant degree of the ith KQI's influence on perception of the network service.

More specifically, taking the game service in the operating network of the operator O in certain country as an example, the indicator weight and adaptive thresholds of 3G and 4G services are shown in the following table.

| KQI name | 3 G low-quality threshold | 3 G high-quality threshold | 4 G low-quality threshold | 4 G high-quality threshold | weight |
|---|---|---|---|---|---|
| Game upload rate (Kbps) | 0.68 | 10.1 | 0.55 | 7.09 | 0.1 |
| Game download rate (Kbps) | 3.59 | 229.97 | 3.58 | 208.31 | 0.1 |
| Game TCP uplink packet loss rate (%) | 0.02 | 0 | 0.07 | 0 | 0.15 |
| Game TCP downlink packet loss rate (%) | 0.03 | 0 | 0.07 | 0 | 0.15 |
| Game TCP uplink average RTT (ms) | 92 | 35 | 117 | 43 | 0.25 |
| Game TCP downlink average RTT (ms) | 84 | 31 | 42 | 17 | 0.25 |

More specifically, taking video-on-demand service of the operating network of the operator O in certain country as an example, it is supposed that there are 5 KQIs, i.e., the video play success rate, the video play waiting delay, the video freezing frequency, the proportion of video freezing duration, and the video download rate, and after calculation, related data of the KQIs are determined as: $\overline{x}_1$=mean value of the video play success rate=85%, $\overline{x}_2$=mean value of the video play waiting delay=2384 ms, $\overline{x}_3$=mean value of the video freezing frequency=1 time/min, $\overline{x}_4$=mean value of the proportion of video freezing duration=30%, $\overline{x}_5$=mean value of the video download rate=934 Kbps; and the weights are respectively: $w_1=0.20$, $w_2=0.25$, $w_3=0.15$, $w_4=0.15$, and $w_5=0.25$, then calculation of the perception score is as following:

$QoE=0.20\times Score_{play\ success\ rate}+0.25\lambda Score_{play\ waiting\ delay}+0.15\times Score_{freezing\ frequency}+0.15\times Score_{proportion\ of\ freezing\ duration}+0.25\lambda Score_{download\ rate}$ the perception score is 2.28 by substituting the data.

On the basis of beneficial effects of the first embodiment, in the embodiment of the application, a pre-determined function capable of mapping to the whole score value range is used when the score is obtained, so that the obtained perception score is not influenced by subjective factors, and the obtained score has a lot of values, which can reflect the perception difference, such that the evaluation is more distinguishable; meanwhile, weighted averaging is used to distinguish different KQIs, so that the perception score can represent the quality of the network service more effectively.

Figure 9:
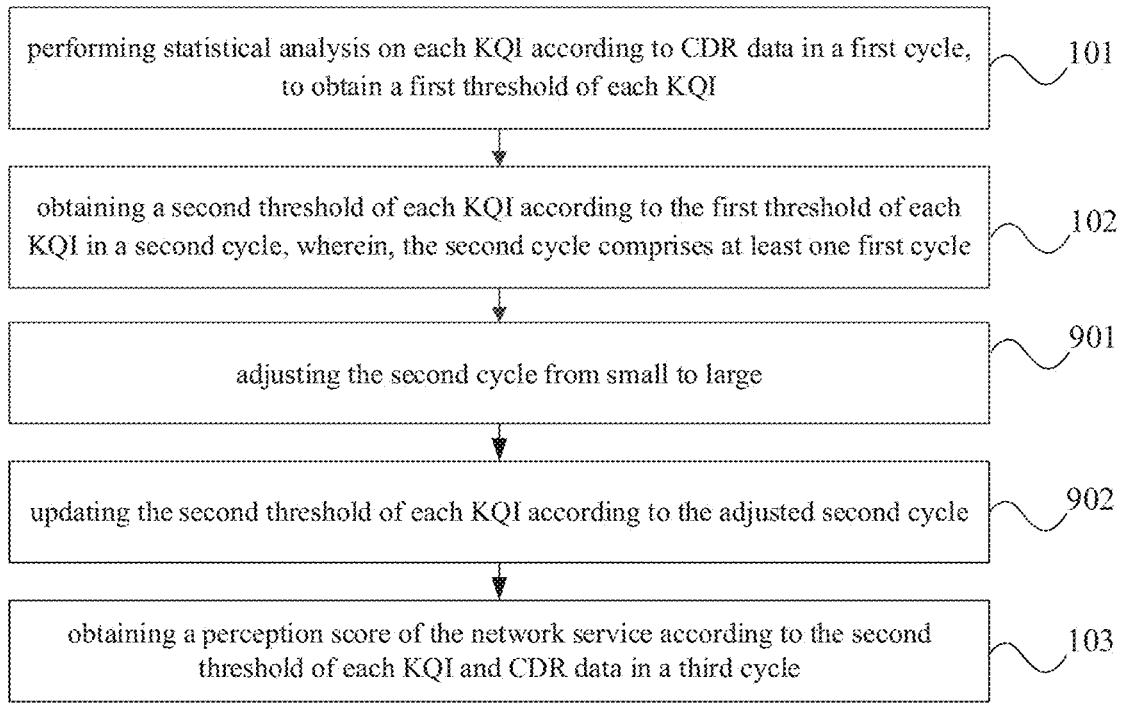
FIG. 9 is a flow chart of a method for evaluating a network service according to a fifth embodiment of the application.

The fifth embodiment of the application relates to a method for evaluating a network service, which is basically the same as the method for evaluating the network service in the first embodiment of the application, and the difference therebetween is that the examination cycle can be adjusted, as shown in FIG. 9, the method specifically comprises:

Step 901, adjusting the second cycle from small to large.

Specifically, a smaller value can be selected as the second cycle in early time, as time goes on, a larger value can be selected as the second cycle, and the second cycle is not adjusted any longer until influence of the second cycle on the perception score tends to be stable. It should be illustrated that, the specific adjustment frequency and the amplitude of each adjustment are not defined.

Step 902, updating the second threshold of each KQI according to the adjusted second cycle.

In the embodiment, the Step 902 is executed once every time the second cycle is adjusted.

On the basis of beneficial effects of the first embodiment, in the embodiment of the application, the examination cycle can be adjusted, so that the stability of the effective threshold of the service quality indicator can be ensured after long term operation of the algorithm, otherwise, the perception score obtained by calculation would change widely, which is unfavorable for analysis on the service low-quality problem.

Figure 10:
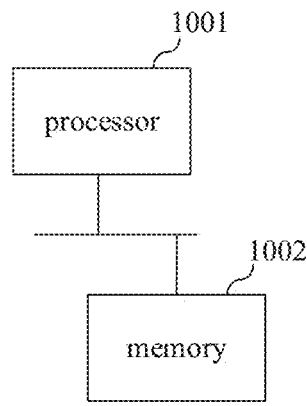
FIG. 10 is a structure diagram of an electronic device according to a sixth embodiment of the application.

The sixth embodiment of the application relates to an electronic device, as shown in FIG. 10, comprising:

at least one processor 1001; and, a memory 1002 in communication connection with the at least one processor 1001;

wherein, the memory 1002 stores an instruction that can be executed by the at least one processor, and the instruction is executed by the at least one processor 1001, so that the at least one processor 1001 can execute the method for evaluating the network service in the first to fifth embodiments of the application.

Wherein, the memory and the processor are connected by a bus, a bus may comprise a random number of interconnected buses and bridges, and various circuits of the one or more processor and memory are connected through the bus. Various other circuits such as periphery equipment, a voltage stabilizer and a power management circuit can be also connected together through the bus, which are well known in the art, and therefore, will not be further described herein. A bus interface provides an interface between the bus and a transceiver. The transceiver may be one component, or multiple components, such as a plurality of receivers and transmitters, which serves as a unit for communication with other apparatuses in the transmission media. Data processed by the processor is transmitted in a wireless medium through an antenna, further, the antenna also receives data and transmits the data to the processor.

The processor is responsible for bus management and common processing, and can provide various functions including timing, periphery interface, voltage regulation, power source management and other control functions. And the memory can be used to store the data used by the processor during execution.

The seventh embodiment of the application relates to a computer readable medium, which stores a computer program. The above embodiments of the method are implemented when the computer program is executed by the processor.

Namely, those skilled in the art can understand that all or part of the steps of the methods in the embodiments can be completed by instructing the relevant hardware through the program, and the program is stored in the storage medium, and comprises multiple instructions through which a device (such as a single-chip microcomputer, chip, and the like) or a processor can execute all or part of the steps of the methods in the embodiments. And the storage medium comprises: USB flash disk, mobile hard disk, read only memory (ROM), random access memory (RAM), magnetic disc or optical disc and other media that can store program codes.

Those skilled in the art can understand that the above embodiments are specific embodiments of the application, and in practical applications, they can be changed in form and detail without departing from the spirit and scope of the application.

The invention claimed is:

1. A method for evaluating a network service, comprising:

obtaining, by an electronic device, call detail record (CDR) data collected from a user plane S1-U interface by a probe arranged between a wireless base station and a service gateway:

performing, by the electronic device, statistical analysis on each key quality indicator (KQI) according to call detail record data in a first cycle, to obtain a first threshold of each KQI;

obtaining, by the electronic device, a second threshold of each KQI according to the first threshold of each KQI in a second cycle, wherein, the second cycle comprises at least one first cycle; and obtaining, by the electronic device, a perception score of the network service according to the second threshold of each KQI and CDR data in a third cycle; wherein the perception score of the network service quantifies user-perceived service quality;

outputting, by the electronic device, the perception score for visualization or diagnostic analysis.

2. The method according to claim 1, wherein, before the performing statistical analysis on each KQI according to CDR data in a first cycle, to obtain a first threshold of each KQI, further comprising:

setting the first cycle, the second cycle and the third cycle;

dividing the CDR data of the S1-U interface according to the type of the network service and the first cycle, to obtain the CDR data in the first cycle; and dividing the CDR data of the S1-U interface according to the type of the network service and the third cycle, to obtain the CDR data in the third cycle.

3. The method according to claim 1, wherein, the performing statistical analysis on each KQI according to CDR data in a first cycle, to obtain a first threshold of each KQI comprising:
obtaining each KQI value of each user according to the CDR data in the first cycle;
counting the number of users at different values of each KQI, to obtain a probability density curve of each KQI; and
analyzing the probability density curve of each KQI, to obtain the first threshold of each KQI.

4. The method according to claim 2, wherein, the performing statistical analysis on each KQI according to CDR data in a first cycle, to obtain a first threshold of each KQI comprising:
obtaining each KQI value of each user according to the CDR data in the first cycle;
counting the number of users at different values of each KQI, to obtain a probability density curve of each KQI; and
analyzing the probability density curve of each KQI, to obtain the first threshold of each KQI.

5. The method according to claim 3, wherein, the analyzing the probability density curve of each KQI, to obtain the first threshold of each KQI comprising:
setting a first threshold quantile and a second threshold quantile for each KQI, wherein the first threshold quantile is smaller than the second threshold quantile; and
obtaining the first threshold of each KQI according to the change characteristic of each KQI, the probability density curve of each KQI, the first threshold quantile and the second threshold quantile, wherein, the first threshold of each KQI comprises a high-quality threshold and a low-quality threshold.

6. The method according to claim 4, wherein, the analyzing the probability density curve of each KQI, to obtain the first threshold of each KQI comprising:
setting a first threshold quantile and a second threshold quantile for each KQI, wherein the first threshold quantile is smaller than the second threshold quantile; and
obtaining the first threshold of each KQI according to the change characteristic of each KQI, the probability density curve of each KQI, the first threshold quantile and the second threshold quantile, wherein, the first threshold of each KQI comprises a high-quality threshold and a low-quality threshold.

7. The method according to claim 5, wherein, the obtaining the first threshold of each KQI according to the change characteristic of each KQI, the probability density curve of each KQI, the first threshold quantile and the second threshold quantile, wherein, the first threshold of each KQI comprises a high-quality threshold and a low-quality threshold comprising:
if the change characteristic of the KQI is that the larger the value is, the better the quality of the network service is, the KQI value corresponding to the first threshold quantile on the probability density curve is the low-quality threshold, and the KQI value corresponding to the second threshold quantile on the probability density curve is the high-quality threshold; and
if the change characteristic of the KQI is that the smaller the value is, the better the quality of the network service is, the KQI value corresponding to the first threshold quantile on the probability density curve is the high-quality threshold, and the KQI value corresponding to the second threshold quantile on the probability density curve is the low-quality threshold.

8. The method according to claim 6, wherein, the obtaining the first threshold of each KQI according to the change characteristic of each KQI, the probability density curve of each KQI, the first threshold quantile and the second threshold quantile, wherein, the first threshold of each KQI comprises a high-quality threshold and a low-quality threshold comprising:
if the change characteristic of the KQI is that the larger the value is, the better the quality of the network service is, the KQI value corresponding to the first threshold quantile on the probability density curve is the low-quality threshold, and the KQI value corresponding to the second threshold quantile on the probability density curve is the high-quality threshold; and
if the change characteristic of the KQI is that the smaller the value is, the better the quality of the network service is, the KQI value corresponding to the first threshold quantile on the probability density curve is the high-quality threshold, and the KQI value corresponding to the second threshold quantile on the probability density curve is the low-quality threshold.

9. The method according to claim 1, wherein, the obtaining a second threshold of each KQI according to the first threshold of each KQI in a second cycle, wherein, the second cycle comprises at least one first cycle comprising:
averaging all the first thresholds of each KQI in the second cycle, to obtain the second threshold of each KQI.

10. The method according to claim 1, wherein, the obtaining a perception score of the network service according to the second threshold of each KQI and CDR data in a third cycle comprising:
classifying the CDR data in the third cycle, to obtain the KQI of each type of CDR data;
averaging the KQI of each type of CDR data respectively, to obtain an average of each KQI in the third cycle;
determining a scoring function of each KQI according to the second threshold of each KQI;
determining the evaluation score of each KQI according to the average of each KQI and the scoring function of each KQI; and
performing weighted averaging on the evaluation scores of the KQIs in the same network service according to preset weights, to obtain the perception score of the network service.

11. The method according to claim 1, wherein, before the obtaining a perception score of the network service according to the second threshold of each KQI and CDR data in a third cycle, further comprising:
adjusting the second cycle from small to large; and
updating the second threshold of each KQI according to the adjusted second cycle.

12. An electronic device, comprising:
at least one processor; and
a memory in communication connection with the at least one processor; wherein,
the memory stores instructions that can be executed by the at least one processor, and the instructions are executed by the at least one processor, so that the at least one processor can execute the method for evaluating the network service according to claim 1.

13. A non-transitory computer readable storage medium, storing a computer program, wherein, when the computer program is executed by a processor, the method for evaluating the network service according to claim 1 is implemented.

* * * * *